United States Patent
Choi et al.

(12) 
(10) Patent No.: US 6,218,501 B1
(45) Date of Patent: Apr. 17, 2001

(54) POLYMALEIMIDE AND POLYIMIDE PHOTO-ALIGNMENT MATERIALS FOR LC DISPLAY

(75) Inventors: Hwan Jae Choi; Joo-Young Kim, both of Taejeon (KR)

(73) Assignees: Cheil Industries Inc.; Samsung Electronics Co., Ltd., both of (KR)

( * ) Notice: Subject to any disclaimer, the term of this patent is extended or adjusted under 35 U.S.C. 154(b) by 0 days.

(21) Appl. No.: 09/353,930

(22) Filed: Jul. 15, 1999

(30) Foreign Application Priority Data

Jul. 15, 1998 (KR) .................................................. 98-28532

(51) Int. Cl.$^7$ ......................... C08G 73/00; G02F 1/1337; C09K 19/00
(52) U.S. Cl. ......................... 528/170; 528/310; 528/322; 528/353; 428/1.2; 428/1.25; 428/411.1; 428/474.5; 349/123; 349/130; 349/132; 349/135; 252/299.01; 252/299.4; 525/55; 525/390; 525/392; 525/397; 526/258; 526/266; 522/35; 522/164
(58) Field of Search ...................................... 528/170, 322, 528/310, 353; 525/55, 390, 392, 397; 428/1.25, 1.2, 411.1, 474.5; 349/123, 130, 132, 135; 522/164, 35; 252/299.01, 299.4; 526/258, 266

(56) References Cited

U.S. PATENT DOCUMENTS

| | | | |
|---|---|---|---|
| 5,464,669 | 11/1995 | Kang et al. | 428/1 |
| 5,976,640 | * 11/1999 | Yu et al. | 428/1.1 |
| 6,048,928 | * 4/2000 | Yu et al. | 525/25 |

OTHER PUBLICATIONS

Martin Schadt, Klaus Schmitt, Vladimir Kozinkov and Vladimir Chigrinov; "Surface–Induced Parallel Alignment of Liquid Crystals by Linearly Polymerized Photopolymers"; Jpn. J. Appl. Phys. vol. 31 (1992) pp. 2144–2164, Part 1, No. 7, Jul. 1992.

Andrey Dyaduysha, Anatolii, Tatyana Marusii, Victor Reshetnyak, Yurly Reznikov and Woo–Sang Park; "Peculiarity of an Oblique Liquid Crystal Alignment Induced by a Photosensitive Orientant"; Jpn. J. Appl. Phys. vol. 34 (1995); pp L1000–1002, Part 2, No. 8A, Aug. 1, 1995.

* cited by examiner

*Primary Examiner*—P. Hampton-Hightower
(74) *Attorney, Agent, or Firm*—Woodcock Washburn Kurtz Mackiewicz & Norris (57) ABSTRACT

The present invention relates to a cinnamatic photopolymerization type homopolymeric or copolymeric alignment material, in which polymaleimide is singly used as the main chain, or is combined with styrene, hydroxystyrene or acrylonitrile to form a copolymer so as to be used as the main chain, or polyimide is used as the main chain.

5 Claims, 2 Drawing Sheets

POLYMALEIMIDE AND POLYIMIDE PHOTO-ALIGNMENT MATERIALS FOR LC DISPLAY

FIELD OF THE INVENTION

The present invention relates to a cinnamatic photo-polymerization type homopolymeric or copolymeric alignment material, in which polymaleimide is singly used as the main chain, or is combined with styrene, hydroxystyrene or acrylonitrile to form a copolymer so as to be used as the main chain, or polyimide is used as the main chain.

BACKGROUND OF THE INVENTION

Figure 1:
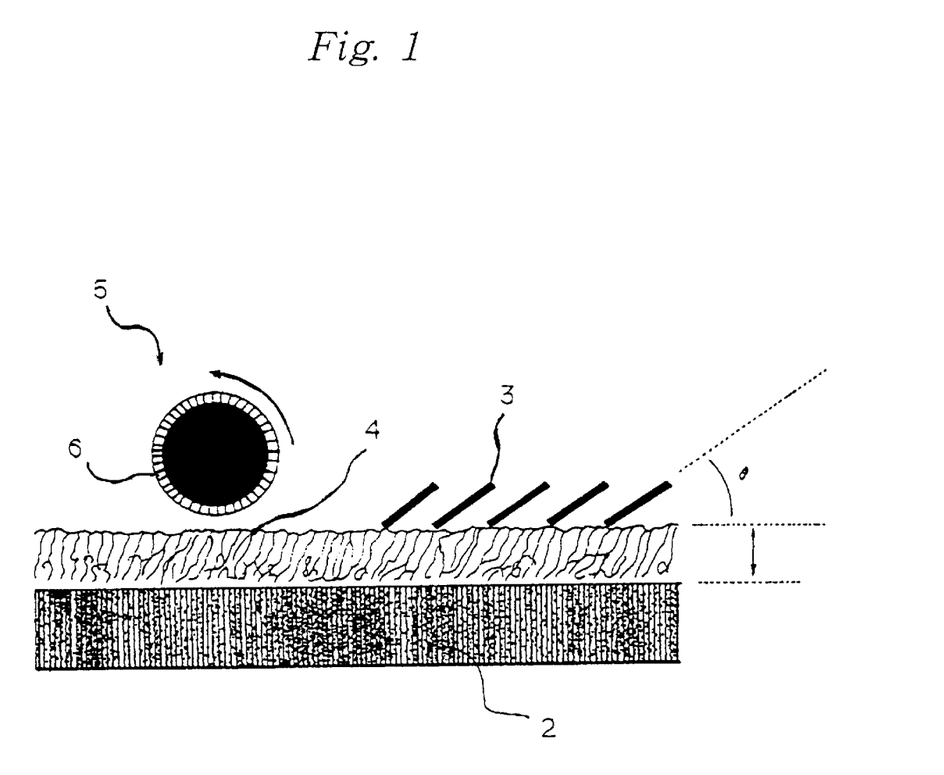
FIG. 1 is a schematic view showing an LC orienting method based on the conventional rubbing process.

In manufacturing an LCD (liquid crystal display) panel, the method of aligning LCD material so far has been as follows. As shown in FIG. 1, orientation material is printed in a thickness of 500–1000 Å on a glass substrate 2, thereby forming a polymer alignment film 4. Then alignment film 3 is rubbed by a roller 5 on which a nylon or rayon cloth 6 is wound, and which revolves at a high speed. Thus alignment film 3 is oriented, and this is called 'rubbing process'.

As shown in FIG. 1, in the case of the rubbing process, the LC molecules are arranged with a certain inclination angle relative to the surface of the alignment material. Because of the simplicity of the rubbing process, it is used in most of the mass productions.

However, the rubbing process can induce mechanical scratches and electrostatic charge, with the result that the thin film transistor is damaged and the yield is aggravated. Therefore recently, studies are carried out on a non-contact aligning method.

Meanwhile, recently, the liquid crystal display has become of a large scale, and the application of the liquid crystal display is being expanded to the wall-suspending TV and the notebook computers. In accordance with this trend, a high quality picture, a high prestige and a wide viewing angle are demanded.

In order to achieve the wide viewing angle, one can divide a picture cell into a plurality of sub-picture cells. This is the multi-domain technique and one of the easiest way to expand viewing angle. In the case where a multi-domain display is to be manufactured by using the alignment material which is originally intended for the rubbing process, there has to be carried out a complicated lithographic process which includes the coating of an alignment film, a rubbing, the coating of a photoresist, an exposure, a development, a rubbing and the removal of the photoresist.

Figure 2:
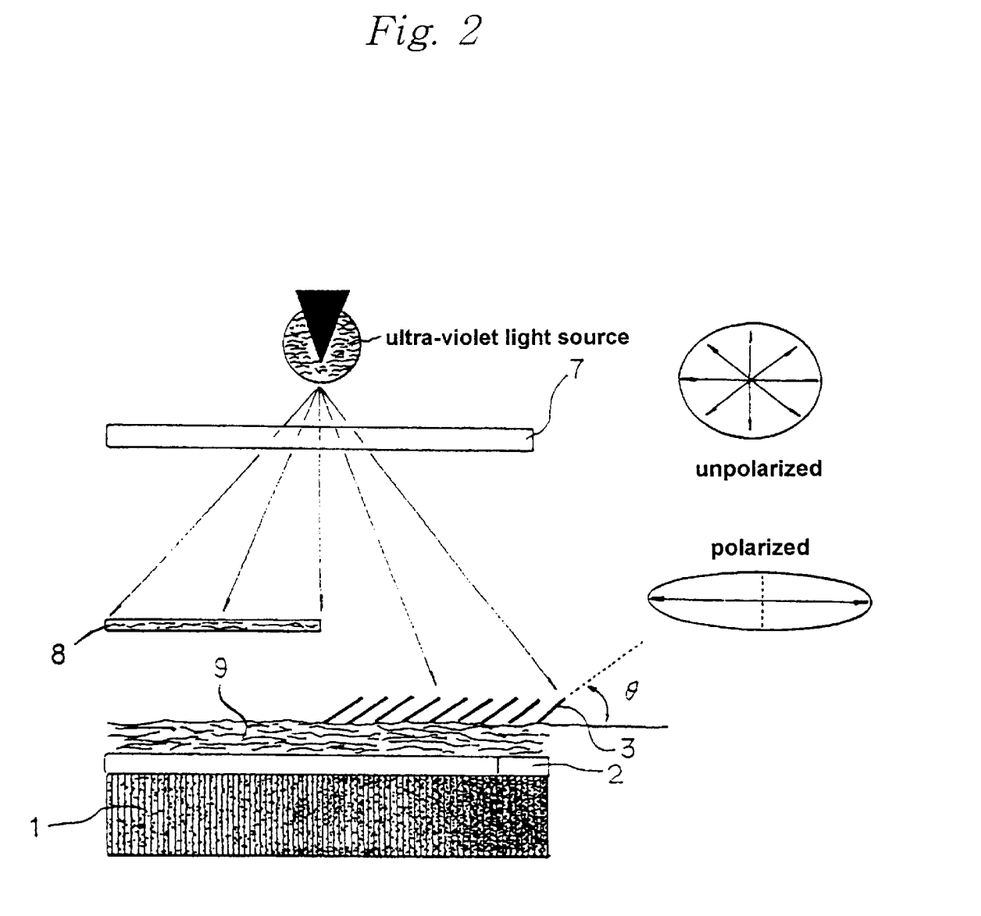
FIG. 2 is a schematic view showing an LC orienting method based on a photo-alignment.

A photo-polymerization type alignment-material can simplify these complicated process as shown in FIG. 2. A typical example of this non-rubbing process was described by M. Schadt et al (Jpn. J. Appl. Phys., Vol. 31, 1992, 2155), by Dae S. Kang et al (U.S. Pat. No. 5,464,669), and by Yuriy Reznikov (Jpn. J. Appl. Phys., Vo. 34, 1992, L1000). The photo-alignment is done in the following manner. That is, a photo-sensitive group which is coupled to the polymer makes a photo-response to ultra-violet rays which have been polarized by a polarizer 7. In this process, the alignment material is arrayed in order, with the result that ultimately the liquid crystal is oriented. Thus a photo-polymerization type LCD orientation film 9 is formed, and this method is called 'photo-alignment'.

The photo-alignment materials which were described in patents and treatises are the ones which are formed by coupling cinnamate to polyvinyl alcohol. They are based on the principle that the divalent bond of cinnamate makes a cycloaddition reaction to the linearly polarized ultra-violet rays. Only the cinnamate group which corresponds to the polarization direction makes a cycloaddition reaction, and thus, the high molecules are arrayed in a certain direction so as to induce the alignment of the LC material. If such an alignment method is employed, domain-divided pixels can be obtained using only a mask, and therefore, the wide viewing angle can be realized in a simple manner.

However, in the conventional method, the photo-alignment material which uses the polyvinyl alcohol polymer as the main chain shows a low thermal stability. Further, the anchoring energy which is the degree of physical interaction between the orientation film and the LC is also low compared with the polyimide alignment material which resorts to the conventional rubbing process.

Therefore, the present inventors came to invent a polymaleimide or polyimide type photo-alignment material in which the conventional problems can be overcome, and in which the heat resistant property and the optical properties are superior.

SUMMARY OF THE INVENTION

It is an object of the present invention to provide a cinnamatic photo-polymerization type LC alignment material, in which the heat resistant property and the optical properties are superior, and in which an polymaleimide or polyimide and various conventional polymers are copolymerized to be used as the main chain.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

The photo-alignment material using the polymaleimide as the main chain according to the present invention is a maleimide homopolymer or a maleimide copolymer. In the present invention, this material is expressed by formulas 1 to 3 as shown below.

Formula 1

Formula 2

Formula 3 wherein, in each of Formulas 1, 2, and 3, n is an integer from 10 to 1000, and wherein R in Formula 1 is represented as the following Formula 1a, while R in Formulas 2 and 3 is H or is represented as the following Formula 1a (not all of R are H.);

(1a)

wherein in each of Formulas 1, 2, 3, and 1a, the substituent designation $H(CH_3)$ indicates that the substituent can be either H or $CH_3$, and wherein, $R_1$ in Formula 1a is selected from the following groups;

(wherein, p=0~6)

$R_2$ is selected from the following groups;

-continued

(wherein, X is F, H, CN, $CF_3$ or $C_mH_{2m+1}$ where m=1–6, Y is F or H, and r=0–6)

The photo-alignment material using polyimide as the main chain according to the present invention is represented by Formula 4:

Formula 4 wherein, n is an integer from 10 to 1000, T is an alicyclic or aliphatic dianhydride, and Q is represented as the following Formula 4a:

(4a)

wherein the substituent designation $CH_3$ ($CF_3$) indicates that the substituent can be either $CH_3$ or $CF_3$, and wherein, R' is represented as the above Formula 1a.

In the photo-alignment material, the dianhydride portion T is formed from the alicyclic or aliphatic dianhydride. In Formula 4, the dianhydride is not specially limited, but the following examples are preferable.

In synthesizing the photo-alignment material of Formula 4, if the alicyclic or aliphatic dianhydride is used, the properties of the alignment film such as light-transmittance, solubility, solution spreadability and the like are improved compared with the generally used aromatic dianhydride. Of course, among the monomers which are used for synthesizing the photo-alignment material of Formula 4, the alicyclic or aliphatic dianhydride can be used not only singly, but also with the aromatic dianhydride. Generally, the photo-alignment material of Formula 4 is synthesized by using dianhydride and diamine. However, there may be also used a compound having an acid structure instead of dianhydride, or isocyanate instead of diamine.

When manufacturing LCD cells by using the photo-polymerization type LC orientation material of the present invention, if the LC is to be oriented, the synthesized photo-alignment material is dissolved into an organic solvent such as chlorobenzene, N-methyl-pyrrolidon (NMP), dimethyl-sulfoxide (DMSO), dimethyl-hydrofuran (THF) or the like. The material is dissolved in this solvent at a concentration of 1 wt % to 10 wt % and at a viscosity of 5 cps–50 cps. Then the solution is spread at a thickness of 500–1000 Å on a glass substrate by spin coating or printing method, thereby forming an alignment film. Then linearly polarized ultra-violet rays are irradiated in an inclined manner onto the surface of the alignment film with appropriate energies, thereby completing the manufacturing of the alignment film.

The LCD panel which is manufactured by using the photo-polymerization type LC alignment material according to the present invention is capable of controlling the pretilt angle of LCs by adjusting the irradiation angle, exposure energy, degree of polarization and so on. Therefore, the LC material according to the present invention can be applied to the conventional TFT-LCD and STN LCD. Further it can be applied to IPS (in-plane switching) mode and the VATN (Vertically Aligned Twisted Nematic) mode which are being developed at present, the former showing a pretilt angle of almost zero degree, and the latter almost 90 degrees. Further the anchoring strength is improves such that it shows the same level as that of the polyimide used in the conventional rubbing process. Therefore, high quality displays are realized.

Now the present invention will be described based on actual examples. These examples are intended to present the present invention more specifically, and should not be construed as restricting or limiting the scope of the present invention.

EXAMPLES

Example 1: Photo-alignment Material Using Maleimide as the Main Chain (1) Synthesis of polyhydroxyphenylmaleimide Maleic anhydride polymer (product of Polyscience Co.) and aminophenol were put respectively in amounts of 5 g together with 100 mL of xylene into a 3-neck round flask into which nitrogen had been filled. Then an agitation was carried out for 30 minutes at the room temperature. Then 2.9 g of isoquinoline was put, and the temperature was raised slowly up to 150 degrees C., so that a reaction would occur. Thus the reaction was carried out for 3 hours while the formed water was slowly discharged. Then the reaction was terminated, and the temperature was lowered to the room temperature. Then the solution was put into 500 mL of methanol to capture the precipitate. Then the precipitate was filtered, and was vacuum-dried at 100 degrees C., thereby obtaining polyhydroxy phenylmaleimide.

(2) Synthesis of side chain

P-hydroxycinnamic acid was put in an amount of 16.42 g (0.1 moles) into 100 mL of dimethylsulfoxide (DMSO) and 100 mL of water in which 8 g of sodium hydroxide had been dissolved. Then at 0 degrees C., 15.86 g of p-fluorobenzoyl chloride were slowly dropped into it, while agitations were carried out violently. Then a reaction was carried out at the room temperature for 2 hours, and then, a neutralization was carried out to pH=6–7 by putting a dilute hydrochloric acid. Then the solid intermediate product which was thus obtained was filtered, and it was washed using water. Then it was slowly dried under vacuum, and then, a recrystallization was carried out in ethanol, thereby obtaining p-fluorobenzoyloxycinnamic acid with a yield of 90%. Then 1.2 equivalents of thionylchloride was put, and then, 50 mL of methylene chloride was added. Then a reaction was carried out at the room temperature until a transparent solution was obtained. After the reaction, the solvent and thionyl chloride were removed under vacuum, and a thorough drying was carried out, thereby obtaining p-fluorobenzoyloxycinnamic chloride.

(3) Synthesis of photo-alignment material based on maleimide

Polyhydroxyphenylmaleimide which had been obtained in Item (1) above was put in an amount of 1.7 g into 50 mL of N-methylpyrrolydone (NMP) to dissolve it. Then 1.0 g of triethylamine was added, and an agitation was carried out for 30 minutes. Then the reaction temperature was lowered to 5 degrees C., and 2.13 g of fluorobenzoyloxycinnamic chloride of the Item (2) was slowly dropped while carrying out wild agitations. After the exhaustion of fluorobenzoyloxycinnamic chloride, the agitation was continued for about 1 hour, and then the reaction was terminated. This was transferred into a beaker in which a mixture of water and methanol was contained, each of their volumes being 200 mL. Then the precipitate was filtered, and then a wash was carried out by using large amounts of water and methanol. Then a vacuum drying was carried out so as to finally obtain a photo-alignment material containing the maleimide as the main chain.

(4) Manufacture of LCD display cells

The photo-alignment material thus obtained was dissolved into a mixed solvent of NMP and γ-butyrolactone at a concentration of 5 wt %. This was printed on a glass substrate on which a transparent electrode had been deposited. Then the glass substrate was dried at 100–200 degrees C. for about 1 hour to remove the solvent. Linearly polarized ultra-violet rays from a 1 KW-mercury lamp were irradiated onto the glass sheet at an angle of 45 degrees for 3 minutes only once, and thus, the cinnamate radicals were photo-reacted, thereby manufacturing LC orientation film. Two of such glass substrates were attached together with a cell gap of 4–5 microns, and then, this structure was subjected to a hot press process over 150 degrees C. for 1 hour, thereby making vacant cell. Then liquid crystal was injected into the completed cell, and then a heat treatment was carried out at 100–130 degrees C. for 1 hour. Then the temperature was lowered to the room temperature, and then the LCD cell was evaluated as to its electro-optical properties. The results are shown in Table 1 below.

Example 2: Photo-alignment Material Having Styrene/maleimidic Copolymer as Main Chain Instead of maleimide monomer of item (1) of Example 1, there was used styrene/hydroxyphenylmaleimide copolymer in the same equivalence ratio. The other materials and conditions were same as those of Example 1. In this manner, a styrene/maleimide photo-alignment material was obtained. An LCD cell using the obtained material was also manufactured in the same manner as that of Example 1. Then the electro-optical properties were evaluated, and the evaluated results are shown in Table 1 below.

Comparative Example 1: Conventional Polyimide Alignment Material Resorting to the Rubbing Process Polyimide for the conventional rubbing process was put on a glass substrate on which a transparent electrode had been deposited. Then the glass substrate was rotated at 3000 rpm to carry out a spin coating at a thickness of 800 Å. After the coating, the glass substrate was dried for 1 hour at 200 degrees C. by using a heating plate. Then a rayon cloth wound on a roller carries out rubbing at 1000 rpm only once. The contact force between the rayon cloth and the polyimide alignment film was such that as soon as the contact between the two was recognized, the roller was fixed. The rubbed upper and lower glass substrates were attached together across a cell gap of 4–5 μm in the same manner as that of Example 1. Then the temperature was lowered to the room temperature, and the electro-optical properties of the LCD panel were evaluated, the results being shown in Table 1 below.

TABLE 1

|  |  | Examples | | Comparative Example 1 |
| --- | --- | --- | --- | --- |
|  |  | 1 | 2 | |
| process |  | non-rubbing | non-rubbing | rubbing |
| alignment material |  | maleimide | styrene/ | polyimide |
| concentration |  | 5 wt % | maleimide 5 wt % | 5 wt % |
| volt/transmit.[1] | V(90%) | 1.4~1.5 | 1.2~3 | 1.6~1.7 |
| (%) | V(50%) | 1.7~1.8 | 1.6~1.7 | 2.1~2.2 |
|  | V(10%) | 2.4~2.5 | 2.2~2.3 | 2.8~2.9 |
| response | Ton[3] | 9~10 | 8~9 | 9~10 |
| (msec) | Toff[4] | 22 | 21 | 23 |
| pretilt angle | room temp. | 4~5° | 4~5° | 3~4° |
| (θ)[2] | heated | 3~4° | 3~4° | 3~4° |
| (C/R) |  | 180 | 190 | 180 |

Notes:
[1]voltage/photo-transmittance (%) was measured by using LCD-5000.
[2]pretilt angle was measured by using the crystal rotation method.
[3]Ton represents time at which the liquid crystals stand up under an electric field.
[4]Toff represents time at which the liquid crystals are restored to the initial position upon removing the electric field.

As can be confirmed by Table 1 above, the polymaleimide photo-polymerization type liquid crystal alignment material had a high thermal stability (which is the basic property of polyimide), a high optical transparency and a superior spreading characteristic. The LCD cell which was manufactured by using the material of the present invention also utilizes the photo-alignment. Therefore, multidomain picture cells could be obtained through a simple process. Even after a high temperature process of over 150 degrees C., the pretilt angle and alignment quality were maintained, and the optical transmittance and the response speed were markedly improved. Therefore, the LCD cell according to the present invention can be applied to LCD devices in which there are demanded a high quality display and a wide viewing angle.

Example 3: Synthesis of Polyimide Photo-alignment Material I (1) Synthesis of 2,2-bis(3-amino-4-hydroxyphenyl)propane 2,2-bis(4-hydroxyphenyl) propane was put in an amount of 20 g together with 150 mL of acetic acid into a 250 mL 3-neck round flask into which nitrogen had been filled. At 10 degrees C., 20 mL of nitric acid was slowly dropped, while agitating violently. During the reaction, the color of the content of the vessel was altered to red-brown, and at 30 minutes after the exhaustion of the nitric acid, the reaction was terminated. Then the content was put into 1000 mL of ethanol, and the solid cake was filtered, and a recrystallization was carried out using ethanol. Then a filtering was carried out, and then, a vacuum drying was carried out. In this manner, there was obtained 23 g of 2,2-bis(3-nitro-4-hydroxyphenyl) propane.

2,2-bis(3-nitro-4-hydroxyphenyl) propane thus obtained was put in an amount of 12 g into a 250 mL 3-neck round flask in which a nitrogen line and a condenser were installed. Then 100 mL of ethanol was put into it, and then 15 mL of hydrazine monohydride and 0.5 g of a catalyst (Pd/C) were put into it. Then the temperature was raised up to 80 degrees C., and then a reaction was carried out for 3 hours. Thus 2,2-bis(3-nitro-4-hydroxyphenyl) propane was gradually dissolved in ethanol to be converted into 2,2-bis(3-amino-4-hydroxyphenyl) propane. After the solid particles were completely dissolved in ethanol, the reaction was terminated, and the palladium catalyst was filtered, thereby obtaining a light yellow transparent solution. This was left at the room temperature to form yellow transparent crystalline particles. Then these particles were filtered and vacuum-dried, thereby obtaining 9 g of 2,2-bis(3-amino-4-hydroxyphenyl) propane.

(2) Synthesis of Polyimide Main Chain using Alicyclic Dianhydride 3 g (0.01 moles) of 4-(2,5-dioxotetrahydrofuran-3-yl)-tetralin-1,2-dicarboxylic anhydride (to be called DOTDA below) and 2.58 g (0.01 moles) of 2,2-bis(3-amino-4-hydroxyphenyl)propane (to be called BAHP below) were put into a 100 mL 3-neck round flask. Then 50 mL of N-methylpyrrolydone was injected, and then, an agitation was carried out violently. After the monomers were all dissolved, 3–4 drops of isoquinoline were added. Then the temperature was raised slowly up to 200 degrees C., and water was discharged sustainedly. After 3 hours of the reaction, the reaction was terminated. Then 500 mL of methanol was injected, the precipitate was captured, the pressure was lowered, a filtering was carried out, and a vacuum drying was carried out, thereby synthesizing polyimide having DOTDA and BAHP as monomers.

(3) Synthesis of side chain 16.42 g (0.1 moles) of p-hydroxycinnamic acid was dissolved in 100 mL of dimethylsulfoxide (DMSO) and 100 mL of water in which 8 g of sodium hydroxide had been dissolved. At zero degrees C., 15.86 g (0.1 moles) of p-fluorobenzoylchloride was slowly dropped while stirring violently. Then the reaction was further carried out for 2 hours at the room temperature, and then, it was neutralized to pH 6–7 by using a dilute hydrochloric acid. Thus a solid intermediate product was obtained, and this product was filtered and thoroughly washed with water. Then it was thoroughly vacuum-dried, and recrystallized in ethanol, thereby obtaining p-fluorobenzoylcinnamic acid with yield of 90%. Then 1.2 equivalents of thionyl chloride was put, and about 50 mL of methylene chloride was added. Then a reaction was carried out until a transparent solution was obtained. After the reaction, the solvent and thionyl chloride ($SOCl_2$) were removed under vacuum, and then, a thorough drying was carried out. Thus was obtained p-fluorobenzoylcinnamoylchloride.

(4) Synthesis of polyimide photo-alignment material I

The polyimide obtained under Item (2) above was put in an amount of 3.8 g into 100 mL of tetrahydrofuran (THP), then 2.5 g of triethylamine was put, and then, an agitation was carried out for 30 minutes. Then the reaction temperature was lowered down to 5 degrees C., and 5.3 g of p-fluoro-benzoyl-cinnamoylchloride (which was obtained under Item (3) was slowly dropped, while agitating violently. After the exhaustion of p-fluorobenzoylcinnamoylchloride, the reaction was further continued for about 1 hour, and then the reaction was terminated. Then it was put into 1000 mL of water, and then the precipitate was filtered. Then a thorough wash was carried out by using a profuse amount of water and methanol, and then a vacuum drying was carried out, thereby finally synthesizing polyimide photo-alignment material I.

(5) Manufacture of LCD display cell

The photo-alignment material thus obtained was dissolved into a mixed solvent of NMP and γ-butyrolactone at a concentration of 5 wt %. This was printed on a glass substrate on which a transparent electrode had been deposited. Then the glass substrate was dried at 100–200 degrees C. for about 1 hour to remove the solvent. Then linearly polarized ultra-violet rays from a 1 KW-mercury lamp were irradiated onto the glass substrate at an angle of 45 degrees for 3 minutes only once, and thus, the cinnamate radicals were photo-reacted, thereby manufacturing a polymer LC orientation film. Two of such glass substrates were attached together across a cell gap of 4–5 µby using an epoxy adhesive, and then, this structure was subjected to a hot press process at above 160 degrees C. for 1 hour, thereby manufacturing the vacant cell. Then liquid crystal was injected into the completed cell, and then a heat treatment was carried out at 100–130 degrees C. for 1 hour. Then the temperature was lowered to the room temperature, and then the LCD cell was evaluated as to its electro-optical properties. The evaluation results are shown in Table 2 below.

Example 4: Synthesis of Polyimide Photo-alignment Material II

Instead of dianhydride DOTDA which was used in Item (2) of Example 3, there was used meso-butane-1,2,3,4-tetracarboxylic dianhydride (to be called MBDA below) in the same equivalence ratio. The other materials and the process steps were same as those of Example 3. In this manner, polyimide photo-alignment material II was obtained. The LCD cell using this material was also manufactured in the same manner as that of Example 3, and the electro-optical properties of the LCD cell were evaluated. The evaluation results are shown in Table 2 below.

The results of Examples 3 and 4 are shown in Table 2 below, comparatively with the results of Comparative Example 1.

TABLE 2

|  | Examples | | Comparative |
| --- | --- | --- | --- |
|  | 3 | 4 | Example 1 |
| process | non-rubbing | non-rubbing | rubbing |
| alignment material | material I | material II | polyimide |
| concentration | 5 wt % | 5 wt % | 5 wt % |
| volt/trannit (%)[1] | | | |
| V(90%) | 1.3~1.4 | 1.4~1.5 | 1.6~1.7 |
| V(50%) | 1.7~1.8 | 1.8~1.9 | 2.1~2.2 |
| V(10%) | 2.3~2.4 | 2.5~2.6 | 2.8~2.9 |
| response (msec) | | | |
| Ton[3] | 8~9 | 9~10 | 9~10 |
| Toff[4] | 16~17 | 18~19 | 23 |
| pretilt angle (θ)[2] | | | |
| room temp. | 5~6° | 5~6° | 3~4° |
| heated | 4~5° | 4~5° | 3~4° |
| (C/R) | 170 | 180 | 180 |

Notes:
[1]voltage/photo-transmittance (%) was measured by using LCD-5000.
[2]pretilt angle was measured by using the crystal rotation method.
[3]Ton represents time at which the liquid crystals stand up under an electric field.
[4]Toff represents time at which the liquid crystals are restored to the initial position upon removing the electric field.

As can be confirmed by Table 2 above, the polyimidic photo-polymerization type liquid crystal alignment material had a good thermal stability (which is the basic property of polyimide), a high optical transparency and a superior spreading characteristic. The LCD cell which was manufactured by using the synthesized material also utilizes the photo-alignment. Therefore, multidomain picture cells could be obtained through a simple process. Even after a high temperature process of over 160 degrees C., the pretilt angle was maintained, and the optical transmittance and the response speed were markedly improved. Therefore, the LCD cell according to the present invention can be applied to an LCD apparatus in which there are demanded a high quality display and a wide viewing angle.

According to the present invention as described above, there is synthesized a photo-polymerization type LC orientation material which has a polyimide polymer as the main chain, and has a cinnamatic group as a side chain. This material is used as the alignment material. Therefore, the problems of the conventional photo-alignment material using the hydrocarbonic polymer (such as polyvinyl alcohol) as the main chain are solved, the problems being such that the thermal stability was low, and that physical bond strength between the alignment material and the LC was low. The LCD panels which use the photo-alignment material according to the present invention will have a high quality image and a high prestige effect.

It should be apparent to those ordinarily skilled in the art that various changes and modifications can be added without departing from the spirit and scope of the present invention. Such changes and modifications should be included in the scope of the present invention.

What is claimed is:

1. A cinnamatic photo-alignment material compound having polymaleimide as a main chain and represented by the formula wherein each $R_3$ is H or $CH_3$, n is an integer from 10 to 1000, and R is represented by the formula:

wherein each $R_4$ is H or $CH_3$ and $R_1$ is selected from the group consisting of:

-continued wherein p=0–6, and $R_2$ is selected from the group consisting of:

-continued wherein X is F, H, CN, $CF_3$, or $C_mH_{2m+1}$ where m=1–6; Y is F or H; and r=0–6.

2. A cinnamatic photo-alignment material compound having polymaleimide as a main chain and which is represented by the formula wherein $R_5$, $R_6$, and $R_7$ are each H or $CH_3$, n is an integer from 10 to 1,000, and R is H or wherein each $R_4$ is H or $CH_3$, and $R_1$, is selected from the group consisting of:

wherein p=0–6, and $R_2$ is selected from the group consisting of:

wherein X is F, H, CN, $CF_3$, or $C_mH_{2m+1}$ where m=1–6; Y is F or H; and r=0–6; provided that not all groups R in the chain are H.

3. A cinnamatic photo-alignment material compound having polymaleimide as a main chain and which is represented by the formula wherein $R_5$, $R_6$, and $R_7$ are each H or $CH_3$, n is an integer from 10 to 1000, and R is H or wherein each $R_4$ is H or $CH_3$ and $R_1$ is selected from the group consisting of:

wherein p=0–6, and $R_2$ is selected from the group consisting of:

wherein X is F, H, CN, CF$_3$, or C$_m$H$_{2m+1}$ where m=1–6; Y is F or H; and r=0–6; provided that not all groups R in the chain are H.

4. A cinnamatic photo-alignment material compound having polyimide as a main chain and which is represented by the formula wherein T is an alicyclic or aliphatic dianhydride, n is an integer from 10 to 1000, and Q is represented by the formula wherein each R$_3$ is CH$_3$ or CF$_3$ and each R' is wherein each R$_4$ is H or CH$_3$ and R$_1$ is selected from the group consisting of:

wherein p=0–6, and R$_2$ is selected from the group consisting of:

wherein X is F, H, CN, $CF_3$ or $C_mH_{2m+1}$ where m=1–6; Y is F or H; and r=0–6.

5. The cinnamatic photo-alignment material compound as claimed in claim 4, wherein dianhydride portion T is selected from the group consisting of:

* * * * *

UNITED STATES PATENT AND TRADEMARK OFFICE
CERTIFICATE OF CORRECTION

PATENT NO. : 6,218,501 B1
DATED : April 17, 2001
INVENTOR(S) : Hwan-Jae Choi and Joo-Young Kim It is certified that error appears in the above-identified patent and that said Letters Patent is hereby corrected as shown below:

<u>Column 11,</u>
Line 8, "μby" should read -- μm by --
Line 41, "volt trannit (%) should read -- volt transmit --

Signed and Sealed this

Twenty-fifth Day of September, 2001

Attest:

NICHOLAS P. GODICI
Attesting Officer  Acting Director of the United States Patent and Trademark Office